United States Patent
Lacher et al.

(10) Patent No.: US 7,681,918 B2
(45) Date of Patent: Mar. 23, 2010

(54) FRAME FOR MOUNTING A SLEW BEARING

(75) Inventors: Robert R. Lacher, Bismarck, ND (US);
Henry J. Weber, Bismarck, ND (US);
Thomas M. Sagaser, Bismarck, ND (US); Kim Michael Kolegraf, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 1086 days.

(21) Appl. No.: 11/291,519

(22) Filed: Dec. 1, 2005

(65) Prior Publication Data

US 2007/0152438 A1 Jul. 5, 2007

(51) Int. Cl.
*B62D 21/00* (2006.01)
(52) U.S. Cl. .................................... 280/781; 180/311
(58) Field of Classification Search ................. 280/781; 180/311, 89.1; 29/897.2; 37/397, 395
See application file for complete search history.

(56) References Cited

U.S. PATENT DOCUMENTS

| | | | |
|---|---|---|---|
| 2,739,716 A | 3/1956 | Poulter | 212/69 |
| 4,231,699 A | 11/1980 | Thompson | 414/687 |
| 4,361,242 A | 11/1982 | Dion et al. | 212/253 |
| 4,391,341 A | 7/1983 | Taghon | 180/9.2 R |
| 4,397,481 A | 8/1983 | Dion et al. | 280/781 |
| 4,622,860 A | 11/1986 | Cametti et al. | 74/448 |
| 6,322,104 B1 * | 11/2001 | Duppong et al. | 280/781 |
| 7,204,518 B2 * | 4/2007 | Kubo et al. | 280/781 |
| 7,204,519 B2 * | 4/2007 | Kubo et al. | 280/781 |
| 7,293,375 B2 * | 11/2007 | Fukushima et al. | 37/397 |
| 7,458,633 B2 * | 12/2008 | Takeuchi et al. | 296/204 |
| 2004/0232687 A1 * | 11/2004 | Kubo et al. | 280/781 |
| 2004/0244231 A1 * | 12/2004 | Kubo et al. | 37/347 |

FOREIGN PATENT DOCUMENTS

| | | |
|---|---|---|
| CN | 1572982 A | 2/2005 |
| EP | 1479832 A2 | 11/2004 |
| EP | 1564113 A1 | 8/2005 |
| EP | 1 479 832 B1 | 6/2008 |
| JP | 05179675 A | 7/1993 |
| JP | 410007017 | 1/1998 |

OTHER PUBLICATIONS

Office Action dated Mar. 11, 2009 from German Application No. 06 83 8192.0.
Chinese Office Action dated Jul. 24, 2009 for Chinese Application No. 200680044884.4.

* cited by examiner

*Primary Examiner*—Paul N Dickson
*Assistant Examiner*—Drew Brown
(74) *Attorney, Agent, or Firm*—Leanne Taveggia Farrell; Westman, Champlin & Kelly P.A.

(57) ABSTRACT

A frame and method for forming a frame to mount a slew bearing to an undercarriage of a work machine that eliminates a machining process. The frame is formed of a single metallic plate. The metallic plate includes a vertical support portion having a first support leg and a second support leg. The metallic plate also includes a substantially planar top surface portion that couples the first support leg to the second support leg. A plurality of spaced apart slew bearing receiving apertures are formed in the substantially planar top surface portion.

16 Claims, 6 Drawing Sheets

FRAME FOR MOUNTING A SLEW BEARING

BACKGROUND OF THE INVENTION

The present invention relates to an undercarriage for a work machine. In particular, the present invention relates to a frame for mounting a slew bearing to the undercarriage of the work machine.

Excavators are widely used track propelling vehicles that include an undercarriage and an upper rotatable frame. The undercarriage includes a substantially horizontal surface that includes a frame for mounting a slew bearing. The slew bearing is configured to rotate the upper rotatable frame. In general, the frame for mounting the slew bearing to the undercarriage is a pedestal type frame. Pedestal type frames include a plurality of welded components. Some of the components are used to form a vertical support, while at least one of the components is used to form a horizontal support.

The component used to form the horizontal support has slight inconsistencies in flatness due to part variation as well as distortion due to welding the component to the vertical support. To properly mount a slew bearing, the horizontal support needs to be flat such that the bearing is accurately positioned on the pedestal frame. To obtain a surface that is flat and perpendicular to a vertical axis of rotation for mounting the slew bearing to the frame, at least one component used to form the horizontal support includes a machined surface. Machining components is a labor intensive and time consuming process that increases manufacturing costs.

SUMMARY OF THE INVENTION

The present invention includes a frame and process for making a frame to mount a slew bearing to an undercarriage of a work machine. The frame is formed using a single metallic plate. The metallic plate includes a vertical support portion having a first support leg and a second support leg. The metallic plate further includes a substantially planar top surface portion that couples the first support leg to the second support leg. A plurality of spaced apart slew bearing receiving apertures are formed in the substantially planar top surface portion.

To make a frame, a metallic plate is provided. The metallic plate is punched to form a plurality of spaced apart slew bearing receiving apertures. The metallic plate is pressed to form a vertical support portion having a first support leg, a second support leg and a substantially planar top surface portion. The planar top surface portion includes the plurality of spaced apart slew bearing apertures and couples the first support leg to the second support leg.

DETAILED DESCRIPTION OF THE PREFERRED EMBODIMENTS

Figure 1:
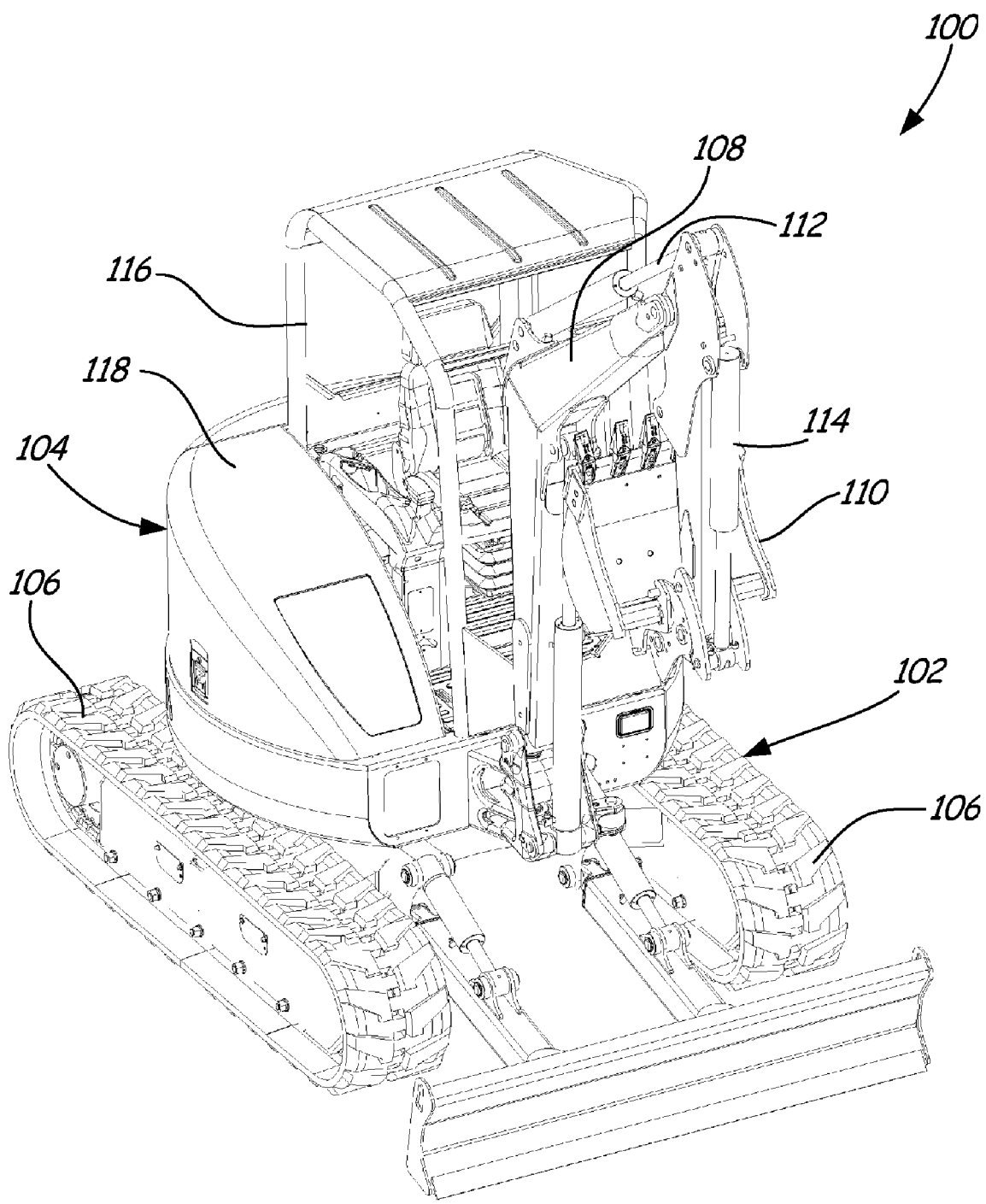
FIG. 1 illustrates a perspective view of a work machine.

FIG. 1 illustrates a perspective view of a work machine 100. Work machine 100 is a self-propelled power excavator that has a chassis or undercarriage 102 and an upper rotatable frame 104. Undercarriage 102 includes a pair of ground engaging track assemblies 106 that are driven with a suitable drive arrangement, such as with hydraulic drive motors. Upper rotatable frame 104 supports a pivotally mounted two section boom 108 with a bucket 110 at the outer end thereof. The sections of boom 108 are operated with hydraulic actuators shown generally at 112 for moving the boom sections about horizontal pivots. Bucket 110 is also operated with a hydraulic actuator 114. Upper rotatable frame 104 also includes an operator's cab 116 and a housing 118 for an engine for providing power to the suitable drive arrangement that drives the pair of ground engaging track assemblies 106. Upper rotatable frame 104 is mounted to undercarriage 102 through a slew bearing (not illustrated in FIG. 1). However, before mounting upper rotatable frame 104 to undercarriage 102, the slew bearing must first be mounted to the undercarriage.

Figure 2:
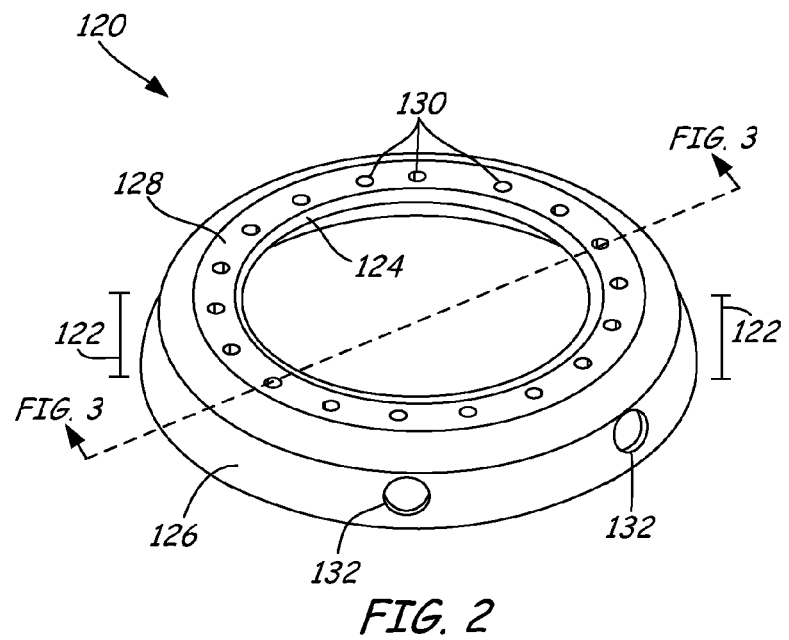
FIG. 2 illustrates a perspective view of a frame for mounting a slew bearing to an undercarriage of a work machine.
Figure 3:
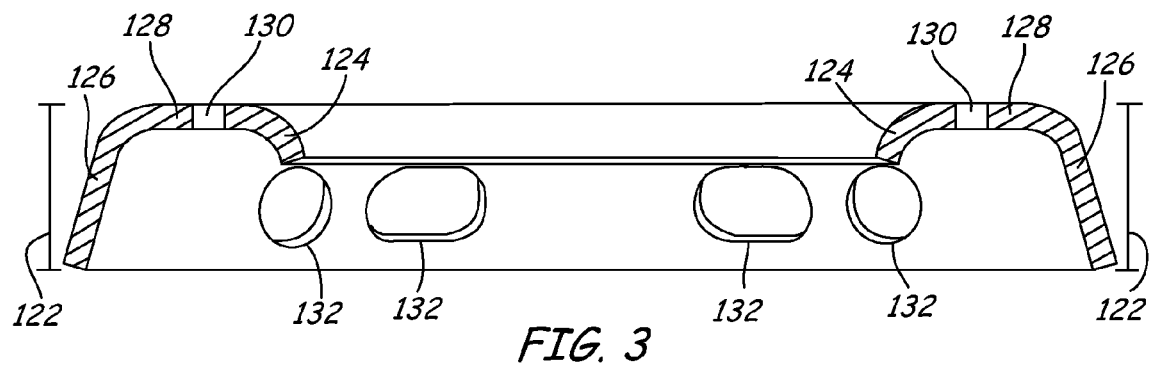
FIG. 3 illustrates a sectional view of the frame illustrated in FIG. 2.

FIG. 2 illustrates a perspective view of a frame 120 for mounting a slew bearing to an undercarriage of a work machine in accordance with the present invention. FIG. 3 illustrates a sectional view of frame 120 taken along the sectional line as indicated in FIG. 2. Frame 120 is a pedestal type frame and is made from a single metallic plate piece, such as a steel plate. By making frame 120 out of a single metallic plate piece, the weld process to join multiple components of a frame is eliminated. By eliminating the weld process, distortion is limited and a machining operation is no longer required to achieve a suitable bearing mounting surface.

Frame 120 includes a vertical support portion 122. Vertical support portion 122 includes a first support leg 124 and a second support leg 126. Frame 120 further includes a substantially planar top surface portion 128 that couples first support leg 124 to second support leg 126. Frame 120 still further includes a plurality of spaced apart slew bearing receiving apertures 130 that are formed in substantially planar top surface portion 128. Second support leg 126 of vertical support portion 122 also includes a plurality of apertures 132. Apertures 132 are for use in accommodating various types of hoses for making various types of connections between undercarriage 102 and upper rotatable frame 104.

Figure 4:
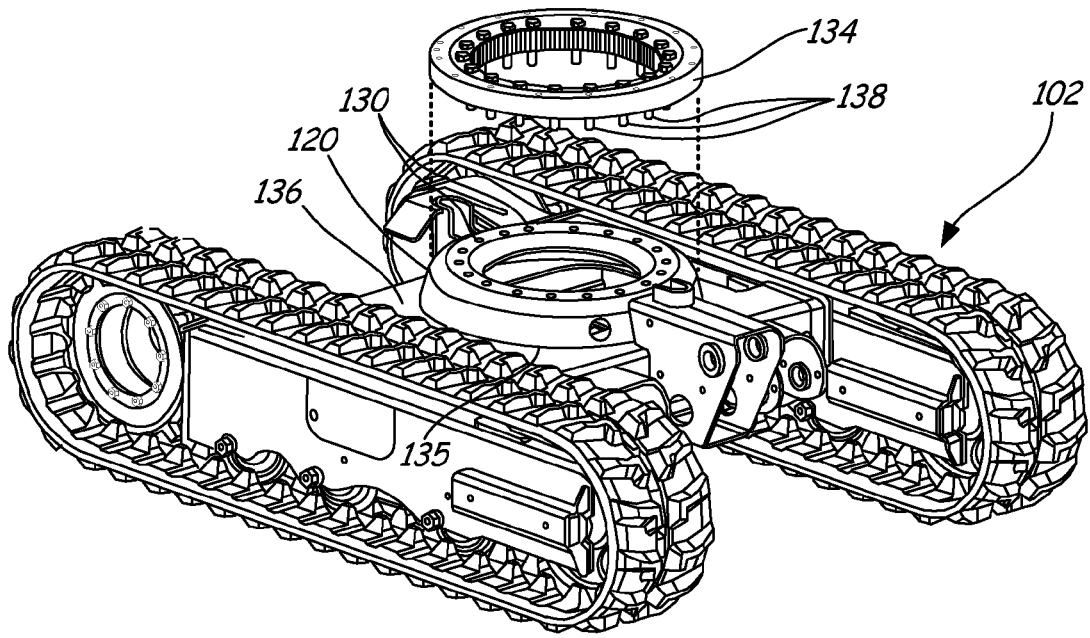
FIG. 4 is a perspective view of an undercarriage of the work machine illustrated in FIG. 1.

FIG. 4 is a perspective view of undercarriage 102 of work machine 100 illustrated in FIG. 1. In FIG. 4, a slew bearing 134 is illustratively exploded from frame 120 in accordance with the present invention. Slew bearing 134 is for use in mounting upper rotatable frame 104 to undercarriage 102. Frame 120 is for use in mounting slew bearing 134 to undercarriage 102. As illustrated in FIG. 4, a bottom end 135 of second support leg 126 is welded to a horizontal surface 136 of undercarriage 102.

Slew bearing 134 includes a plurality of bolts 138. The plurality of slew bearing receiving apertures 130 are configured to receive the plurality of bolts 138 of slew bearing 134. Bolts 138 are then fastened to frame 120 for a secured mounting and coupling of slew bearing 134 to undercarriage 102.

Figure 5:
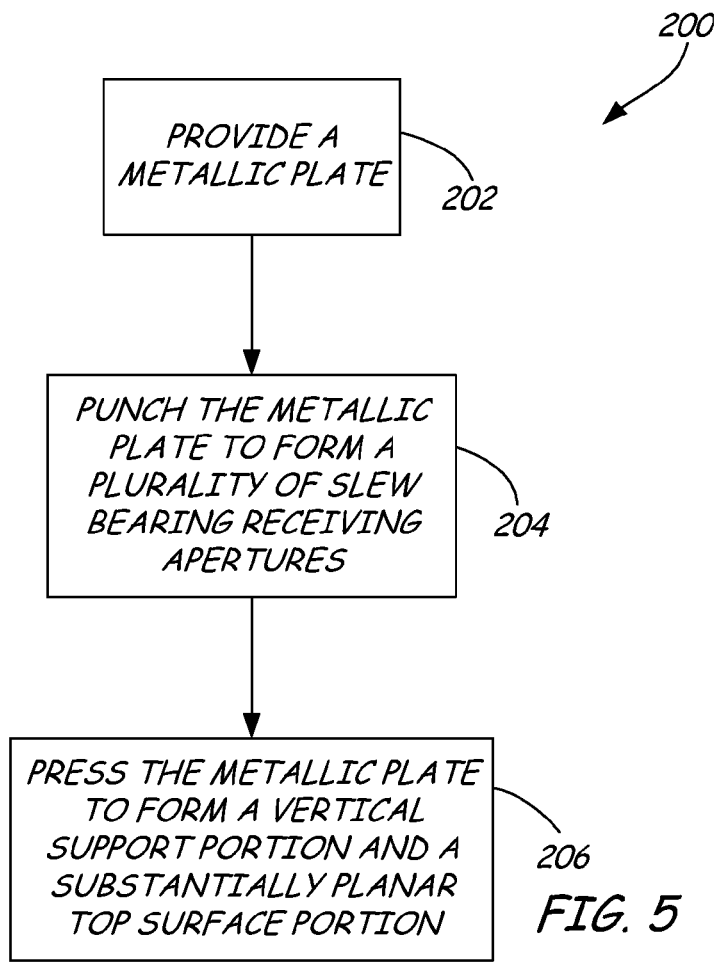
FIG. 5 is a flowchart illustrating a method of forming a frame used to mount a slew bearing to an undercarriage of a work machine.
Figure 6:
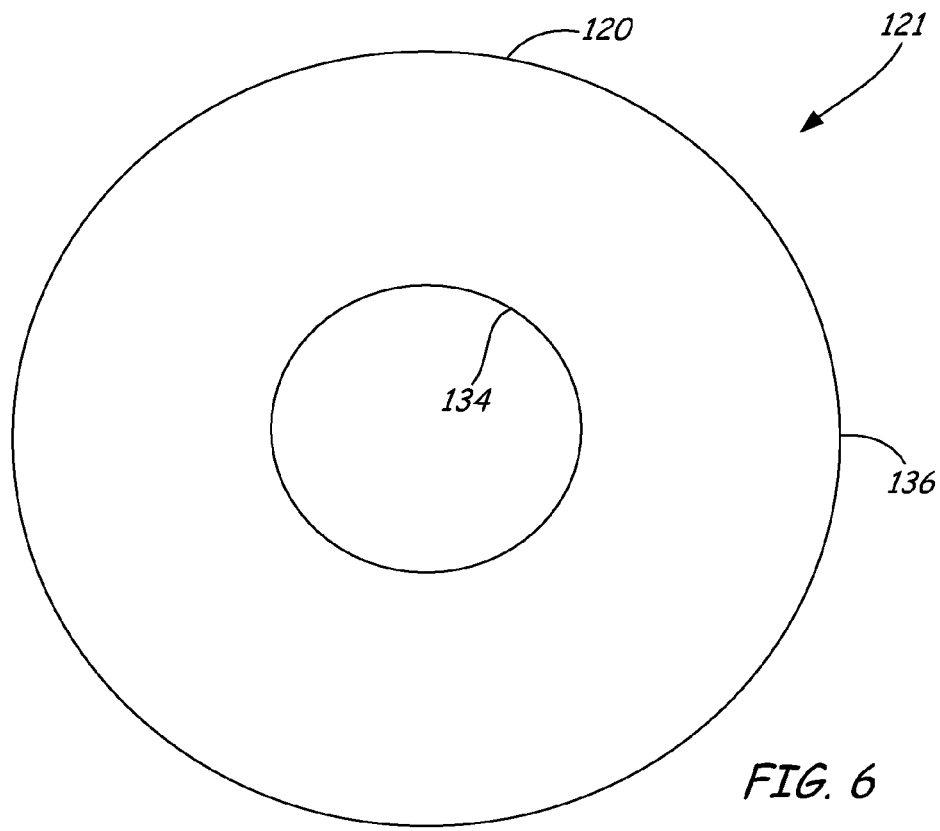
FIG. 6 illustrates a metallic plate.

FIG. 5 is a flowchart 200 illustrating a method of forming frame 120 (FIGS. 2 and 3) for mounting a slew bearing to an undercarriage of a work machine in accordance with the present invention. At block 202, a metallic plate is provided. Such a metallic plate to form frame 120 is illustrated in FIG. 6 as metallic plate 121. In FIG. 6, metallic plate 121 is illustrated as a circular metallic plate. For example, metallic plate 121 can be regarded as a toroidal shaped metallic plate having an inner diameter 134 and an outer diameter 136. However, the present invention is not limited to a circular shaped plate. Other shapes are possible.

Figure 7:
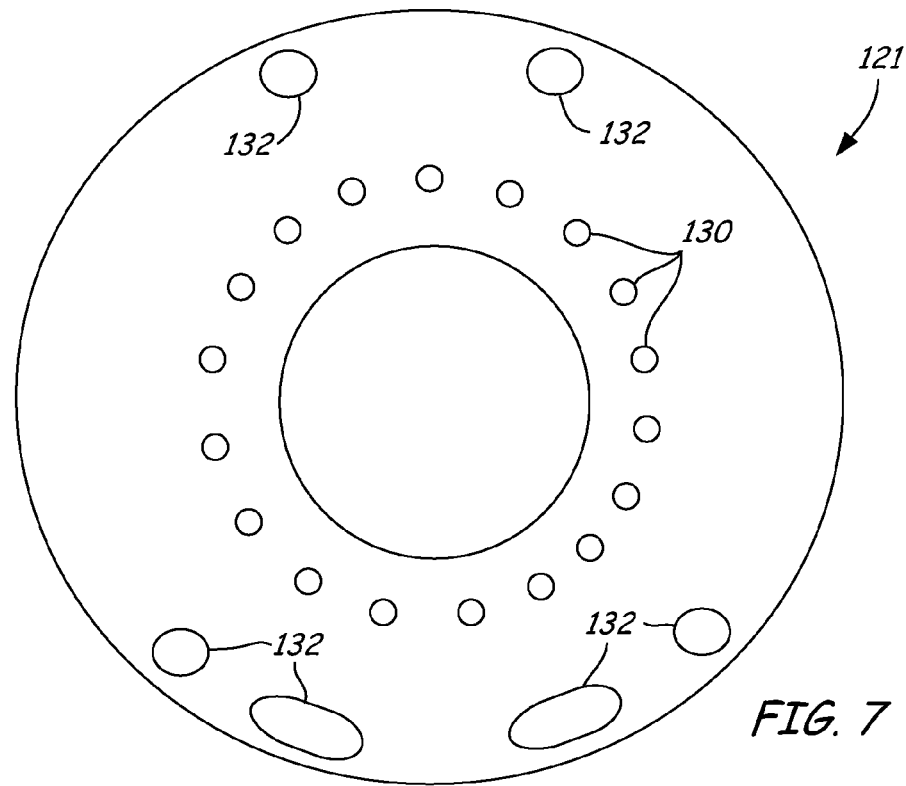
FIG. 7 illustrates a metallic plate including punched apertures.

At block 204, metallic plate 121 is punched to form the plurality of spaced apart slew bearing receiving apertures 130. In some embodiments, this step also includes punching of the second plurality of apertures 132 as illustrated in FIG. 7. Slew bearing receiving apertures 130 are configured to receive a plurality of bolts from a slew bearing and apertures 132 are configured to accommodate various types of hoses for use in the work machine. As illustrated in FIG. 7, the plurality of slew bearing receiving apertures 130 are radially spaced apart on metallic plate 121 between inner diameter 134 and outer diameter 136.

Figure 8:
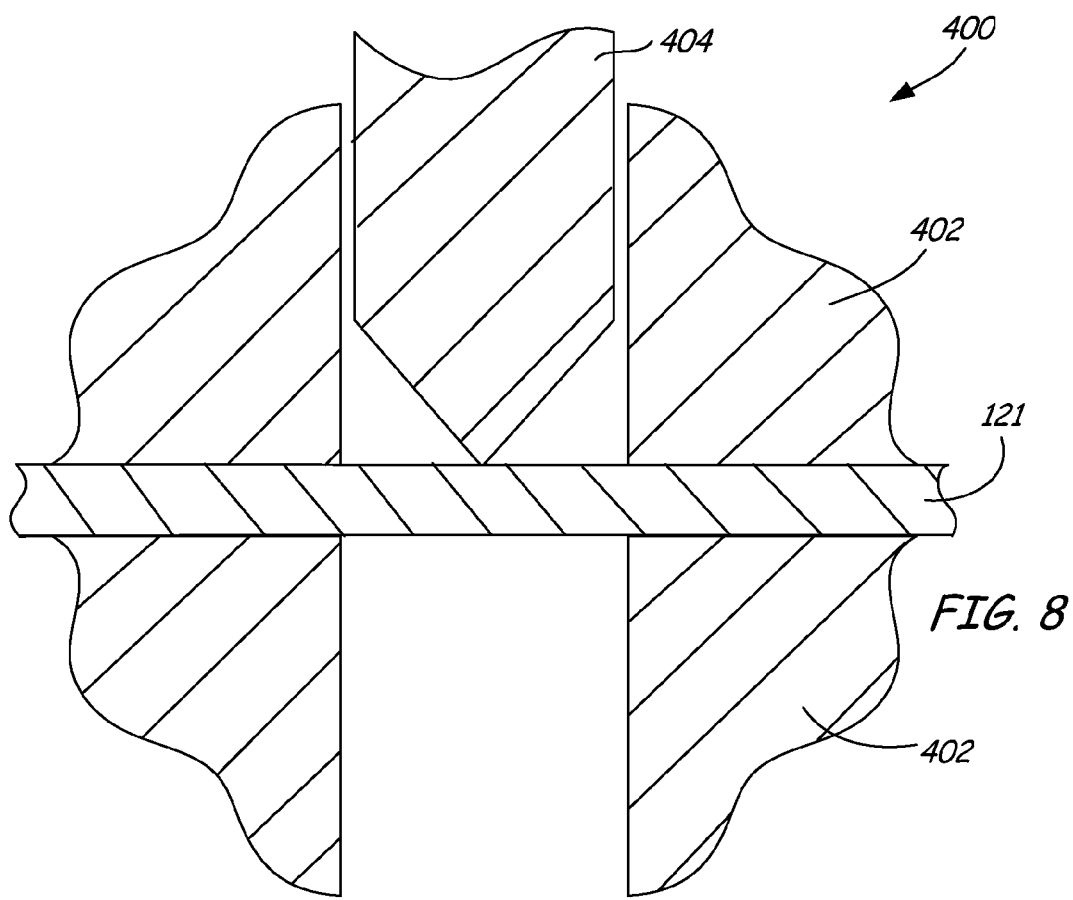
FIG. 8 illustrates a simplified sectional view of a punch die configured to form apertures in a metallic plate.

FIG. 8 illustrates a simplified sectional view of a punch tool 400 for use in forming slew bearing receiving apertures 130 and apertures 132 in accordance with an embodiment the present invention. Punch tool 400 includes a die 402 and a punching mechanism 404. Metallic plate 121 is placed in die 402 and punch mechanism 404 punches out an aperture. Die 402 and punch mechanism 404 can be used to punch out each slew bearing receiving aperture 130 and aperture 132. However, die 402 can be equipped with many punching mechanisms to punch out each aperture 130 and 132 substantially simultaneously.

Figure 9:
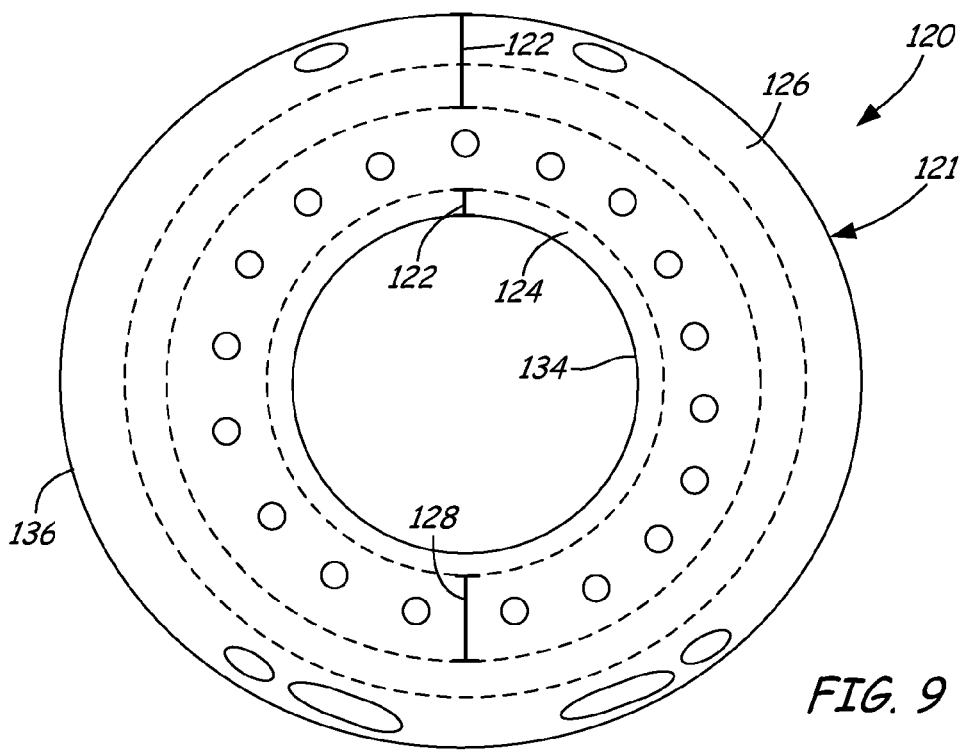
FIG. 9 illustrates a top view of the frame illustrated in FIG. 2.

At block 206, metallic plate 121 is pressed to form vertical support portion 122 and a substantially planar top surface portion 128. The result of the pressing step is illustrated in FIG. 9. In FIG. 9, metallic plate 121 is shown as a top view of frame 120 for mounting a slew bearing to an undercarriage of a work machine. Vertical support portion 122 includes first support leg 124 and second support leg 126. First support leg 124 is bent into shape and located between inner diameter 134 and substantially planar top surface portion 128. Second support leg 126 is bent into shape and located between outer diameter 136 and substantially planar top surface portion 128.

Figure 10:
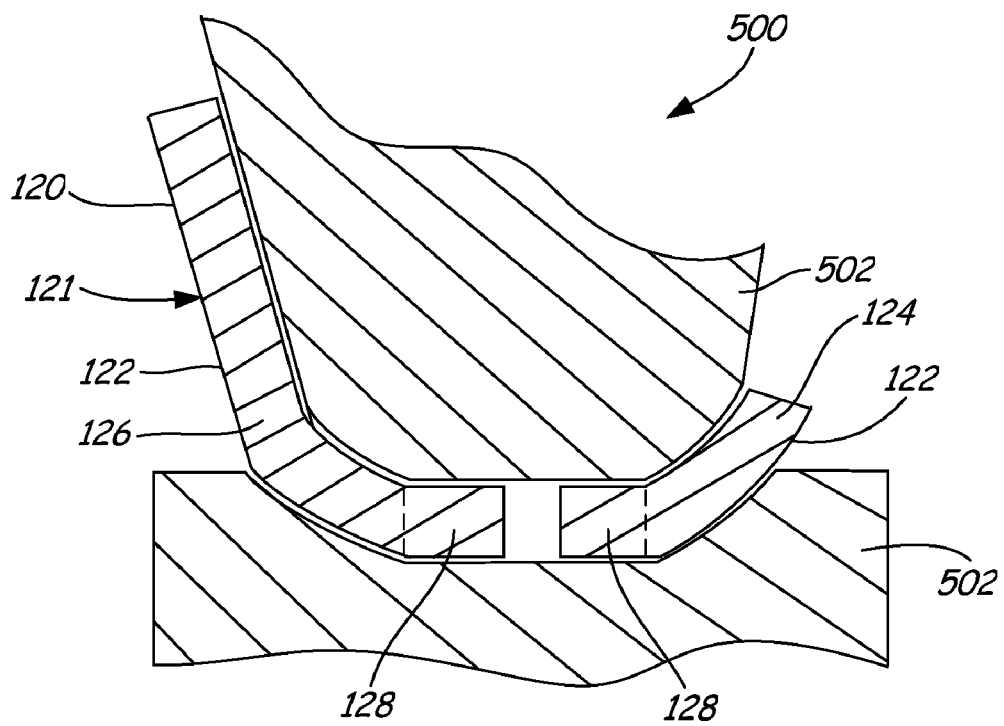
FIG. 10 illustrates a simplified sectional view of a press die configured to form bends in a metallic plate.

FIG. 10 illustrates a simplified sectional view of a press tool 500 for use in forming vertical support portion 122 and substantially planar top surface portion 128 in accordance with an embodiment of the present invention. Press tool 500 includes a die 502. Metallic plate 121 is placed in die 502 and is pressed to form the shape of frame 120. Die 502 bends first support leg 124 and second support leg 126 while pressing substantially planar top surface portion 128 flat.

Figure 11:
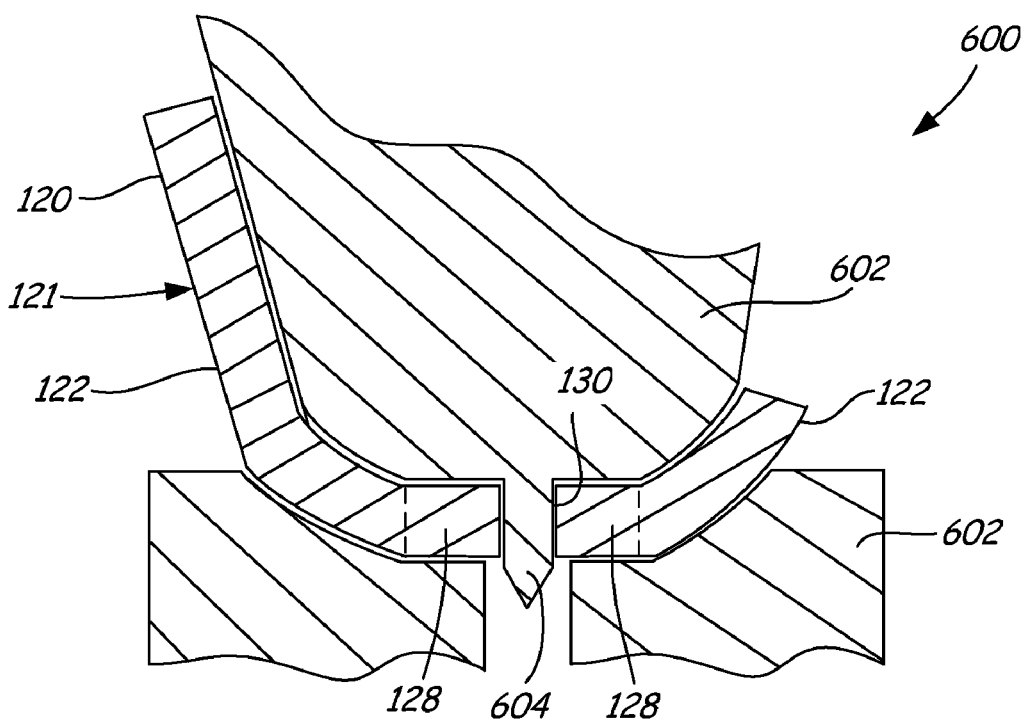
FIG. 11 illustrates a simplified sectional view of a punch and press die for forming a frame for use in mounting a slew bearing to an undercarriage of a work machine.

FIG. 11 illustrates a simplified sectional view of a press and punch tool 600 for use in forming vertical support portion 122, substantially planar top surface portion 128 and apertures 130 in accordance with an embodiment of the present invention. Although FIGS. 8 and 10 illustrate two separate tools for forming frame 120, it is also possible to use a single tool to form frame 120. Press and punch tool 600 includes a die 602 and punch mechanisms 604. Metallic plate 121 is placed in die 602. Substantially simultaneously press and punch tool 600 presses and punches metallic plate 120 to form the shape of frame 120. Die 602 bends first support leg 124 and second support leg 126, presses substantially planar top surface portion 128 flat and punches each slew bearing receiving aperture 130 and other apertures 132 for accommodating hoses using one or more punch mechanism(s) 604.

Although the present invention has been described with reference to preferred embodiments, workers skilled in the art will recognize that changes may be made in form and detail without departing from the spirit and scope of the invention.

What is claimed is:

1. A frame for mounting a slew bearing to an undercarriage of a work machine, the frame comprising:
    a single metallic plate including an inner diameter and an outer diameter, the single metallic plate comprising:
    a vertical support portion including a first support leg and a second support leg;
    a substantially planar top surface portion that couples the first support leg to the second support leg;
    a plurality of spaced apart slew bearing receiving apertures formed in the substantially planar top surface portion; and
    the first support leg is formed between the inner diameter and the substantially planar top surface portion that includes the plurality of spaced apart slew bearing receiving apertures.

2. The frame of claim 1, wherein the single metallic plate comprises a circular metallic plate.

3. The frame of claim 1, wherein the circular metallic plate comprises a toroidal metallic plate.

4. The frame of claim 1, wherein the plurality of spaced apart slew bearing receiving apertures are formed between the inner diameter and the outer diameter.

5. The frame of claim 1, wherein the second support leg is formed between the outer diameter and the substantially planar top surface portion.

6. The frame of claim 1, wherein the vertical support portion and the substantially planar top surface portion are formed with a press tool.

7. The frame of claim 1, wherein the plurality of spaced apart slew bearing receiving apertures are formed with a punch tool.

8. The frame of claim 1, wherein the vertical support portion and the substantially planar top surface portion are substantially simultaneously formed with a press and punch tool.

9. An undercarriage for a work machine comprising:
    a pair of ground engaging track assemblies;
    a drive assembly for driving the track assemblies;
    a frame configured to mount a slew bearing to the undercarriage and including an inner diameter and an outer diameter, the frame comprising:
    a vertical support portion including a first support leg and a second support leg;
    a substantially planar top surface portion that couples the first support leg to the second support leg;
    a plurality of spaced apart slew bearing receiving apertures formed in the substantially planar top surface portion;
    wherein the vertical support portion and the substantially planar top surface portion are formed of a single metallic plate; and
    the first support leg is formed between the inner diameter and the substantially planar top surface portion that includes the plurality of spaced apart slew bearing receiving apertures.

10. The undercarriage of claim 9, wherein the work machine comprises an excavator.

11. The undercarriage of claim 9, wherein the work machine comprises an upper rotatable frame coupled to the undercarriage with the slew bearing.

12. A frame for mounting a slew bearing to an undercarriage of a work machine, the frame including an inner diameter and an outer diameter and comprising:
- a substantially planar top surface portion;
- a first set of apertures formed through the substantially planar top surface portion; and
- a vertical support portion integrally formed with the planar top surface and including a first support leg and a second support leg, wherein the first support leg is formed between the inner diameter of the frame and the planar top surface portion and the second support leg is formed between the outer diameter of the frame and the planar top surface portion.

13. The frame of claim 12, further comprising a second set of apertures formed through the second support leg.

14. The frame of claim 13, wherein the second set of apertures are configured to accommodate hoses for making connections between the undercarriage of the work machine and an upper rotatable frame of the work machine.

15. The frame of claim 12, wherein the first set of apertures comprises slew bearing receiving apertures for receiving a plurality of bolts on a slew bearing.

16. The frame of claim 12, wherein a dimension of the first support leg between the inner diameter of the frame and the planar top surface portion is less than a dimension of the second support leg between the outer diameter of the frame and the planar top surface portion.

* * * * *